United States Patent [19]
Estes et al.

[11] 3,855,335
[45] Dec. 17, 1974

[54] METHOD OF STEAM DEALKYLATION

[75] Inventors: John H. Estes; Edwin R. Kerr; Tansukhlal G. Dorawala, all of Wappingers Falls, N.Y.

[73] Assignee: Texaco Inc., New York, N.Y.

[22] Filed: Dec. 14, 1973

[21] Appl. No.: 424,980

[52] U.S. Cl. ............................................. 260/672 R
[51] Int. Cl. .............................................. C07c 3/58
[58] Field of Search ................................ 260/672 R

[56] References Cited
UNITED STATES PATENTS
2,960,545  11/1960  Seubold .......................... 260/672 R
3,291,850  12/1966  Carson ............................ 260/672 R Primary Examiner—C. Davis
Attorney, Agent, or Firm—T. H. Whaley; C. G. Ries

[57] ABSTRACT

Alkylaromatic hydrocarbons are dealkylated with steam, preferably at 900°–1,200°F., in the presence of, as catalyst, an activated metal screen containing a major portion of nickel. In preferred operation, toluene is converted to benzene by dealkylating at 900°–1200°F over inconel metal mesh which has been activated typically by heating to 700°–1,400°F in air for 4–24 hours.

19 Claims, No Drawings

METHOD OF STEAM DEALKYLATION

FIELD OF THE INVENTION

This invention relates to the conversion of hydrocarbons. More particularly, it relates to the dealkylation of alkylaromatic hydrocarbons such as toluene.

BACKGROUND OF THE INVENTION

As is well known to those skilled in the art, steam dealkylation has commonly been carried out by passing an alkylaromatic hydrocarbon, typically toluene, together with steam through a furnace at 600°–950°F to yield a product containing principally benzene. Steam dealkylation is carried out in the presence of catalysts; and typical catalyst compositions may include zeolites or amorphous inorganic oxides such as silica, alumina, silica-alumina magnesia, zirconia, etc. commonly bearing metal oxides. It is found that the typical supported catalyst degrades in the presence of the reactants during the extended periods of reaction. Furthermore, the sintering effects of steeam may permanently deactivate the typical prior art catalysts. These factors limit the conditions under which dealkylation may be carried out in order to maintain reasonable catalyst life.

It is an object of this invention to provide a steam dealkylation process characterized by the presence of a rugged, regenerable, steam-stable catalyst. Other objects will be apparent to those skilled in the art.

STATEMENT OF THE INVENTION

In accordance with certain of its aspects, the novel process of this invention for dealkylating an alkylaromatic hydrocarbon charge may comprise passing a mixture of steam and an alkylaromatic hydrocarbon, at steam dealkylating conditions, into contact with an activated catalyst consisting essentially of a massive metal screen containing at least about 50%, and preferably 50–95 percent nickel, thereby forming a product gas containing dealkylated alkylaromatic hydrocarbon; and recovering said product gas.

DESCRIPTION OF THE INVENTION

In accordance with certain of its aspects, the charge alkylaromatic hydrocarbon which may be treated by the process of this invention may be a stream typically having a boiling point of 176°–1292°F (80°–700°C). The stream may contain alkylaromatic hydrocarbons, either pure or in admixture, in varying quantities. This charge stream may typically contain toluenes, xylenes, ethyl benzenes, propyl benzenes etc. The preferred charage hydrocarbon contains a toluene; and in the preferred embodiment, it may be substantially entirely toluene se.

Typical charge streams which may be treated by the process of this invention may include aromatic extracts or reformate streams containing alkylaromatic hydrocarbons. Illustrative of such charge streams may be a reformate commonly containing the following components (percent by volume):

TABLE

| Component | Broad | Typical |
| --- | --- | --- |
| Paraffins | 30–45 | 40 |
| Olefins | 0–2 | 1 |
| Naphthenes | 1–5 | 3 |
| Aromatics | 45–65 | 56 |

Of the aromatic content of the reformate, 80–100percent, typically 90 percent may be present as alkylaromatic hydrocarbons.

This reformate may have a (RON Clear) octane number of 90, an IBP of 115°F, an EP of 410°F, an API gravity of 47.7.

Particularly desirable results may be achieved by use, as the hydrocarbon charge, of compositions containing substantial proportions of toluene.

Steam dealkylation of the hydrocarbon charge may be carried out by passing the charge at pressure of 0–500 psig, preferably 100–300 psig, say 200 psig together with steam in amount of 2–30 moles, preferably 2–20 moles, say 20 moles per mole of hydrocarbon charge (corresponding to 100–1,250 percent, say 1,000 percent of the stoichiometric amount) to a reaction zone.

The temperature of steam dealkylation may be 900°–1,200°F, preferably 1000°–1200°F, say about 1,200°F. Dealkylation at temperatures below 900°F gives undesirably low yields of dealkylated product eg benzene. As the temperature of dealkylation increases toward 1,200°F, the yield may increase — in the case of benzene production, it may for example rise to about 20 percent; it is found however that at about 1,200°F, the curve of yield as a function of temperature drops sharply. Accordingly if one attempts to operate at 1,200°F or slightly higher (but below 1,250°F) the operation may not be consistent because the operating curve may be very steep. Accordingly best operating procedure may require that the temperature be not above 1,200°F i.e., it may be just below. Typically it may be 1,150°–1,190°F in the case of dealkylation of toluene to give benzene.

It is a feature of the novel process of this invention that it be carried out in the presence of a catalyst consisting essentially of a metal screen containing at least about 50 percent nickel. Although it may be possible to use a screen containing 95–100 percent nickel, it is found that such catalysts are undesirably characterized by an activation time which is substantially longer than that of the preferred catalysts containing 50–95 percent nickel — by a substantial time factor eg 40 hours for pure nickel versus 16 hours for inconel metal containing 76 percent nickel. It is also found that the use of catalyst containing more than 95 percent nickel yields a system which takes 200–1,800 percent longer to come on stream (i.e., to reach equilibrium) and the yield of desired product may be 10–40 percent less than that obtained with the preferred catalyst. The preferred catalyst is also found to be more temperature-stable i.e., to maintain its physical integrity and operability for 10–50 percent, say 20 percent longer than the less preferred catalyst. For these reasons, the preferred catalyst may consist essentially of a metal screen containing 50–95 percent nickel. Typical of the preferred metals which may be employed may be those having the composition set forth in the following table:

TABLE

| Alloy | Ni | C | Si | S | Mn | Fe | Cu | Cr |
|---|---|---|---|---|---|---|---|---|
| 1 | 80 | | | | | | | 20 |
| 2 | 80 | | | | | | | 20 |
| 3 | 60 | 0.5 | | | 1.75 | 10 | | |
| 4 | 73 | | | | 0.2 | 6.5 | | |
| 5 | 75 | | | | 2 | 12 | | 11 |
| 6 | 61 | | | | | 23 | | 16 |
| 7 | 60 | 0.1 | | | | 24 | 16 | |
| 8 | 76 | 0.04 | 0.20 | 0.0075 | | 7.2 | 0.10 | 15.8 |

The preferred metal may be one containing at least 50 percent nickel, preferably 50–95 percent, more preferably about 60–90 percent, more preferably one containing at least about 75 percent nickel. A more preferred metal may be one containing at least about 75 percent nickel, 10–20 percent, say about 16 percent chromium, and about 5–15 percent, say about 7 percent iron and lesser amounts of other components. The preferred metal may be a nickel-chromium alloy such as that sold as Inconel 600 containing about 76 percent nickel, 15.8 percent chromium, 7.2 percent iron, 0.20 percent silicon, 0.10 percent copper, 0.04 percent carbon, and 0.007 sulfur.

Although a spool of wound wire or crushed wire may be employed as the massive metal screen catalyst, it is preferred to use a metal screen which is made of a woven wire mesh. Typically the wire mesh may be made of wire having diameter of 0.003 to 0.182 mm preferably 0.0045–0.018 mm, say 0.05 mm.

The preferred catalyst may be mesh made of Inconel 600 metal; and the woven metal screen or wire mesh may be rolled into a cylindrical roll in manner so that typically 60–90 grams may occupy 100 cc of reaction volume. This may provide a surface area of 2–100 cm$^2$, typically 10–40, say 17 cm$^2$ per gram of catalyst.

In practice of the process of this invention, the hydrocarbon charge may be passed into contact with the catalyst at a weight hourly space velocity WHSV of 0.01–1.0, preferably 0.1–0.5, say 0.150.

It is a feature of the processes of this invention that the catalyst be activated prior to use; and preferably this is carried out by heeating to 700°–1,400°F, say 800°F. at 0–400 psig, say 200 psig for 4–24 hours, say about 18 hours in the presence of an oxygen-containing gas, typically air, at a space velocity VHSV of 50–1,000, say 300.

Alternatively if the catalyst does not reach full activity due to presence of trace amounts of poisons, activation may be effected by (a) maintaining the catalyst at 1,200°–1,400°F for 0.5–6 hours in the presence of charge hydrocarbon without steam (b) introducing steam into the flowing charge hydrocarbon, and (c) adjusting the temperature to desired operating temperature. If the yield is below desired levels, this procedure may be repeated.

During steam dealkylation in practice of the process of this invention, the charge alkylaromatic hydrocarbons may be converted to give significant quantities of the dealkylated product. Typically, yields as high as 20 percent may be obtained; and yields as high as 10 percent are common.

It is a feature of this invention that use of the novel metal screen catalyst, containing about 50–95 percent nickel in the preferred embodiment, permits attainment of outstanding results. It is also a feature of these catalysts, particularly inconel wire mesh, that they permit attainment of substantially greater yields of dealkylated product than may be obtained by the use of alloys containing lesser quantities of (or no) nickel on the one hand or of metal catalysts containing 95–100 percent nickel on the other hand.

The novel catalyst systems of the preferred embodiment of this invention are particularly characterized by their ability to come on stream quickly at their maximum level of activity. For example it may be found that an inconelcontaining catalyst may reach its substantial maximum catalytic activity after 1–5 hours, frequently after only about one hour of operation; a less preferred pure nickel catalyst may require as long as 12–18 hours to reach maximum level.

The effluent or product stream from the stream dealkylation process may contain, in addition to steam and hydrogen, the desired aromatic product, oxides of carbon, and small quantities of low molecular weight paraffins eg methane. In the case of toluene dealkylation, the main products found in the product gas may be benzene, carbon oxides, methane, hydrogen, water, and unreacted toluene.

A typical product gas from the steam dealkylation of a toluene charge may contain the following parts by weight:

TABLE

| Component | Broad | Typical |
|---|---|---|
| Hydrogen | 0.2–40 | 2.0 |
| Steam | 60–100 | 68.5 |
| Methane | 0.01–1.5 | 0.6 |
| Benzene | 0.1–20 | 3.0 |
| Toluene | 2–22 | 7.3 |
| CO | 0.1–4 | 2.9 |
| CO$_2$ | 0.1–30 | 15.79 |

DESCRIPTION OF PREFERRED EMBODIMENT

Practice of the process of this invention will be apparent to those skilled in the art from the following illustrative embodiments wherein, as elsewhere in this description, all parts are parts by weight unless otherwise specifically stated.

EXAMPLES I-III

In this series of control examples, a wire mesh made of 11 mil Inconel 600 nickel-containing wire was used as catalyst. 150 grams of this mesh, possessing a surface area of 17 square centimeters per gram, were rolled into a cylindrical roll and fitted into approximately 200 cc of reactor volume. Toluene vapor at the WHSV (in grams per hour per gram of catalyst) noted was passed through the catalyst under conditions set forth in the following Table to yield the results noted therein:

TABLE

| Hours on Stream | I*<br>1 | II*<br>2 | III*<br>3 |
|---|---|---|---|
| Temp. °F. | 1205 | 1205 | 1205 |
| Press. psig | 198 | 201 | 201 |
| H₂O:Toluene Mole Ratio | 20 | 20 | 20 |
| Toluene WHSV | 0.150 | 0.150 | 0.150 |
| Toluene Conversion % Charge | 0.6 | 0.3 | 0.4 |
| Benzene Yield Mole % Charge | 0.1 | 0.1 | 0.2 |

* Control Example

From the above Table, it will be apparent that the yield of benzene in Control Examples I, II, and III of the unactivated catalyst, was unsatisfactory.

EXAMPLES IV–VIII

In this series of experimental examples, the catalyst is activated prior to use by heating in one liter (STP) of air per minute (VHSV of 300) at 800°F and 200 psig for about 18 hours. The catalyst (160.1g of Inconel wire mesh as in Examples I–III in a volume of 200 cc) is used to dealkylate toluene.

The conditions of operation and the results were as set forth in the following Table:

TABLE

| | IV | V | VI | VII | VIII |
|---|---|---|---|---|---|
| Hours on Stream | 4 | 5 | 9 | 11 | 12 |
| Temp. °F | 1200 | 1200 | 1200 | 1200 | 1200 |
| Press psig | 200 | 200 | 200 | 200 | 200 |
| H₂O: Toluene mole ratio | 20 | 20 | 20 | 20 | 20 |
| Toluene WHSV | 0.150 | 0.150 | 0.150 | 0.150 | 0.150 |
| Toluene Conversion % Charge | 28.1 | 37.8 | 43.4 | 53.3 | 73.9 |
| Benzene Yield mole % charge | 8.7 | 10.4 | 10.6 | 11.9 | 13.1 |

From the above Table, it will be apparent that toluene may be converted to benzene.

EXAMPLES IX–XI

In the following series of examples, various metals were used as catalyst as follows:

Example IX — 144g of Inconel 600 screen (11 mil) containing 76 percent Ni, 15.8 percent Cr, 7.4 percent Fe, 0.20 percent Si, 0.10 percent Cu, 0.04 percent C, and 0.007% S;

Example X — no catalyst i.e., empty reactor;

Example XI — 163 g of SS 304 (Stainless Steel) screen of 11 mil wire having specifications: 19 percent Cr, 9 percent Ni, 2.00 percent max Mn, 1.0 percent Si, 0.08 percent C, and balance Fe;

Example XII — 162 g of SS 430 (Stainless Steel) screen (11 mil) having specifications: 16 percent Cr, 1.00 percent max Mn, 1.00 percent Si, 0.12 percent C, 0.04 percent P, 0.03 percent S, and balance Fe.

TABLE

| | IX | X* | XI* | XII** |
|---|---|---|---|---|
| Temp°F | 1200 | 1200 | 1200 | 1200 |
| Pressure psig | 200 | 200 | 200 | 200 |
| Toluene WHSV | 0.125 | 0.125 | 0.125 | 0.125 |
| H₂O: Toluene Mole Ratio | 24 | 24 | 24 | 24 |
| Toluene Conv. Mole % Charge | 59 | 18 | 8 | 15 |
| Benzene Yield Mole % Charge | 20 | 2 | 2 | 4 |
| % Ni in Cat | 76 | — | 9 | 0 |

From the above Table, it will be apparent that the metal catalyst of Example IX containing about 76 percent nickel, permitted attainment of benzene yields of 20 mole percent of charge. In contrast, the benzene yield was 2 percent in the empty reactor. Use as catalyst of a metal containing 9 percent nickel yielded only 2 percent benzene: and use of a metal with no nickel yielded only 4 percent benzene. Thus it is clear that the process of this invention permits attainment of outstanding results.

It may be noted that use of metal containing nickel in amount less than about 50 percent or greater than about 95 percent yields substantially lower toluene conversion and benzene yield.

Results comparable to the above (eg Examples IV–VIII) may be obtained when steam dealkylating xylene, ethylbenzene, cyclohexylbenzene, cumene, methyl naphthalene etc.

In another series of Examples, the same charge as used for Examples IX–XII is steam dealkylated at comparable conditions of pressure, space velocity, and steam-to-toluene mole ratio — with the temperature of operation varied. The results noted were as follows:

TABLE

| Example | Temp. °F | Benzene Yield Mol % |
|---|---|---|
| XIII | 850 | 0.1 |
| XIV | 1050 | 5.0 |
| XV | 1050 | 9.0 |
| XVI | 1200 | 12.0 |
| XVII | 1200 | 20. |
| XVIII | 1250 | 9.0 |
| XIX | 1250 | 0.8 |

It will be apparent from the above Table that steam dealkylation at 850°F (Ex XIII) gives undesirably low yields of benzene. It will also be apparent that operation within the scope of this invention at eg 1,050°F and 1,200°F (Examples XIV–XVII) gives satisfactory yields of desired benzene product. It is believed that the curve of benzene yield as a function of temperature reaches a sharp peak at about 1,200°F or just below that point; and the curve thereafter drops sharply toward no benzene yield at about 1,250°F (qv Ex XIX).

Points typified by Examples XVIII at 1,250°F or Examples IV–VIII at 1200°F are believed to be on the descending portion of the almost vertical curve; and it is believed that this is the reason why the benzene yield at 1,200°–1,250°F varies over a wide range.

From this, it will be apparent that although it may be possible to obtain satisfactory results at eg 1,200°F or slightly higher (but below 1,250°F) consistent satisfactory operation is achieved by operating at temperatures just slightly below 1,200°F (eg 1,150°–1,190°F) on the ascending portion of the curve.

Although this invention has been illustrated by reference to specific embodiments, it will be apparent to those skilled in the art that various changes and modifications may be made which clearly fall within the scope of this invention.

We claim:

1. The method of steam dealkylating an alkylaromatic hydrocarbon charge which comprises
   passing a mixture of steam and an alkylaromatic hydrocarbon, at steam dealkylating conditions, into contact with an activated catalyst consisting essentially of a massive metal screen containing at least about 50 percent nickel thereby forming a product gas containing dealkylated alkylaromatic hydrocarbon; and
   recovering said product gas.

2. The method of steam dealkylating an alkylaromatic hydrocarbon charge as claimed in claim 1 wherein said activation includes heating said massive metal in the presence of an oxygen-containing gas.

3. The method of steam dealkylating an alkylaromatic hydrocarbon charge as claimed in claim 1 wherein said activation includes heating said massive metal at 700°F–1,400°F in the presence of an oxygen-containing gas.

4. The method of steam dealkylating an alkylaromatic hydrocarbon charge as claimed in claim 1 wherein said activation includes heating said massive metal at 700°–1,400°F in the presence of air.

5. The method of steam dealkylating an alkylaromatic hydrocarbon charge as claimed in claim 1 wherein said catalyst contains about 50–95 percent nickel.

6. The method of steam dealkylating an alkylaromatic hydrocarbon charge as claimed in claim 1 wherein said catalyst contains about 60–90 percent nickel.

7. The method of steam dealkylating an alkylaromatic hydrocarbon charge as claimed in claim 1 wherein said catalyst contains about 75 percent nickel.

8. The method of steam dealkylating an alkylaromatic hydrocarbon charge as claimed in claim 1 wherein said catalyst contains about 76 percent nickel and about 15.8 percent chromium.

9. The method of steam hydrocarbon charge as claimed in claim 1 wherein said catalyst is inconel metal.

10. The method of steam dealkylating an alkylaromatic hydrocarbon charge as claimed in claim 1 wherein said catalyst is in the form of wire.

11. The method of steam dealkylating an alkylaromatic hydrocarbon charge as claimed in claim 1 wherein said catalyst is in the form of wire mesh.

12. The method of steam dealkylating an alkylaromatic hydrocarbon charge as claimed in claim 1 wherein said charge alkylaromatic hydrocarbon contains an alkyl benzene.

13. The method of steam dealkylating an alkylaromatic hydrocarbon charge as claimed in claim 1 wherein said charge alkylaromatic hydrocarbon contains a toluene.

14. The method of steam dealkylating an alkylaromatic hydrocarbon charge as claimed in claim 1 wherein said steam dealkylation is carried out at 900°–1,200 F.

15. The method of steam dealkylating an alkylaromatic hydrocarbon charge which comprises
    passing a mixture of 2–30 moles of steam and one mole of an alkylaromatic hydrocarbon into contact, at steam dealkylating conditions, with an activated catalyst consisting essentially of a massive metal screen containing 50–95 percent nickel thereby forming a product gas containing dealkylated alkylaromatic hydrocarbon; and
    recovering said product gas.

16. The method of steam dealkylating an alkylaromatic hydrocarbon charge containing toluene which comprises
    passing said alkylaromatic hydrocarbon charge, and steam in amount of 2–30 moles per mole of hydrocarbon charge, into contact at 900°–1,200°F and 0–500 psig with, as catalyst, a screen of activated metal containing 50–95 percent nickel thereby forming a product gas containing benzene; and
    recovering said product gas.

17. The method of steam dealkylating an alkylaromatic hydrocarbon charge containing toluene which comprises
    passing said alkylaromatic hydrocarbon charge, and steam in amount of 2–30 moles per mole of hydrocarbon charge, into contact at 900°–1,200°F and 0–500 psig with, as catalyst, a screen of metal containing 50–95 percent nickel which has been activated by heating at 700°–1,400°F in the presence of air, thereby forming a product gas containing benzene; and
    recovering said product gas.

18. The method of steam dealkylating a hydrocarbon charge containing toluene which comprises
    maintaining a body of catalyst consisting essentially of a massive metal screen containing 50–95 percent nickel;
    heating said body of catalyst at 900°–1,400°F in the presence of an oxygen-containing gas thereby forming an activated catalyst;
    passing a mixture of alkylaromatic hydrocarbon charge, and steam in amounts of 2–30 moles per mole of hydrocarbon charge, into contact with said activated catalyst thereby forming a product gas containing benzene; and
    recovering said product gas.

19. The method of steam dealkylating toluene which comprises
    passing one mole of toluene and 2–30 moles of steam at temperature of 1,150°–1,190°F into contact with a body of catalyst metal containing about 75 percent nickel, which has been activated by heating at 700°–1,400°F in the presence of air, thereby forming a product gas containing benzene; and
    recovering said product gas.

* * * * *

UNITED STATES PATENT OFFICE
CERTIFICATE OF CORRECTION

PATENT NO. : 3,855,335  
DATED : December 17, 1974  
May 5, 1975  
INVENTOR(S) : J. ESTES - E. KERR - T. DORAWALA It is certified that error appears in the above-identified patent and that said Letters Patent are hereby corrected as shown below:

Column 1 line 53    correct the spelling of "charge"

Col. 3 line 26    Before "sulfur", insert --percent--;

line 45    correct the spelling of "heating"

Col. 4 line 24    correct "inconel-containing";

line 28    change "stream" (second occurrence) to --steam--;

line 47    in the Table, the entry corresponding to methane in the second column should be corrected to read --0.1-1.5-- rather than "0.01-1.5"

Col. 6 line    Below the Table insert --*Control

Signed and Sealed this nineteenth Day of August 1975

[SEAL]

Attest:

RUTH C. MASON  
Attesting Officer

C. MARSHALL DANN  
Commissioner of Patents and Trademarks